(12) United States Patent
Fukushima

(10) Patent No.: US 7,065,993 B2
(45) Date of Patent: Jun. 27, 2006

(54) MOTOR-DRIVEN STEERING LOCK DEVICE

(75) Inventor: Keisuke Fukushima, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 0 days.

(21) Appl. No.: 10/998,031

(22) Filed: Nov. 29, 2004

(65) Prior Publication Data

US 2005/0268676 A1    Dec. 8, 2005

(30) Foreign Application Priority Data

Jun. 4, 2004  (JP)  ............................. 2004-167425
Jun. 4, 2004  (JP)  ............................. 2004-167427

(51) Int. Cl.
*B60R 25/02*   (2006.01)

(52) U.S. Cl. ............................. 70/252; 70/185; 70/183

(58) Field of Classification Search .......... 70/181–189, 70/252; 292/170, 172, 176, 140, 144
See application file for complete search history.

(56) References Cited

U.S. PATENT DOCUMENTS 3,794,796 A * 2/1974 Dwan ........................... 70/252
5,230,233 A * 7/1993 Shoji et al. ................... 70/252
5,896,765 A * 4/1999 Peyre et al. .................. 70/186
5,904,232 A * 5/1999 Shen ............................. 70/223
6,412,318 B1 * 7/2002 Shen ............................. 70/217
6,647,751 B1 * 11/2003 Zillmann ..................... 70/186
6,755,058 B1 * 6/2004 Zillmann ..................... 70/252
6,889,532 B1 * 5/2005 Fukushima .................. 70/185
2001/0025516 A1 * 10/2001 Starken ........................ 70/186
2004/0074266 A1 * 4/2004 Zillmann ..................... 70/186

FOREIGN PATENT DOCUMENTS

JP        2002-205622        7/2002

* cited by examiner

*Primary Examiner*—Brian E. Glessner
*Assistant Examiner*—Christopher Boswell
(74) *Attorney, Agent, or Firm*—Wenderoth, Lind & Ponack, L.L.P.

(57) ABSTRACT

In the motor-driven steering lock device 10, cam grooves 50 inclined relative to a circumferential direction of a cylindrical part 46 of a lock bolt 44 are formed on an outer circumferential surface of the cylindrical part 46, a cylindrical rotator 26 that is driven to rotate by an electric motor 16 is provided, the cylindrical part 46 of the lock bolt 44 is disposed inside the rotator 26 so as to be movable in an axial direction of the rotator 26, and cam followers 32 held in longitudinal grooves 30 of the rotator 26 are moved in the cam grooves 50 so as to move the lock bolt 44.

4 Claims, 5 Drawing Sheets

MOTOR-DRIVEN STEERING LOCK DEVICE

RELATED APPLICATIONS

This application is based on Japanese Patent Application Nos. 2004-167425 and 2004-167427, the contents of which are incorporated herein by reference.

BACKGROUND OF THE INVENTION

The present invention relates to a motor-driven steering lock device for locking steering wheel of a motorcar or the like.

Conventionally, there have been known steering lock devices that are used for locking steering wheel of motorcars or the like for purpose of preventing theft. In a steering lock device, generally, an engagement recess is provided on an outer circumference of a steering shaft that rotates with steering wheel operation. When a lock bolt is advanced into and engaged with the engagement recess, the rotation of the steering shaft is thereby restricted and the steering wheel is locked. When the lock bolt is ejected and disengaged from the engagement recess, on the other hand, the on the rotation of the steering shaft is thereby lifted and the steering wheel is unlocked.

Among the steering lock devices are motor-driven steering lock devices in which an electric motor provides driving force for moving the lock bolt between a locked position where the lock bolt is engaged with the steering shaft and an unlocked position where the lock bolt is disengaged from the steering shaft. In a motor-driven steering lock device disclosed in Japanese Patent Laid-Open Publication No. 2002-205622, a lock bolt moves between a locked position and an unlocked position in synchronization with rotational movement of a cam member actuated by an electric motor. In the motor-driven steering lock device of this type, the cam member is disposed so as to rotate in a direction of the movement of the lock bolt, and there is a problem in that increase in a stroke of the movement of the lock bolt particularly leads to increase in a size of the cam member and thus results in increase in a size of the motor-driven steering lock device itself.

In the motor-driven steering lock devices in which the electric motor provides the driving force for moving the lock bolt between the locked position where the lock bolt is engaged with the steering shaft and the unlocked position where the lock bolt is disengaged from the steering shaft, exertion of a torque on the steering shaft with the lock bolt engaged with the steering shaft may make it impossible to draw out the lock bolt from the engagement recess because a stationary steering torque exerted on the lock bolt brings an inner side surface of the engagement recess into pressure contact with the lock bolt. Increase in a force for drawing out the lock bolt, as a countermeasure against the above problem, requires increase in a size of the electric motor or provision of reduction gears or the like and also causes the problem of the increase in the size of the motor-driven steering lock device. In a motor-driven steering lock device disclosed in Japanese Patent Laid-Open Publication No. 2002-283961, a lock bolt is drawn out from a steering shaft with use of a screw shaft and a nut. The device, however, has a problem in that the drawing operation requires much time because a pitch of a screw thread is small.

SUMMARY OF THE INVENTION

An object of the present invention is to provide a motor-driven steering lock device of which a size can be decreased with a simple configuration and in which a force for drawing out a lock bolt can be increased.

In order to achieve the object, a first aspect of the invention provides a motor-driven steering lock device that moves a lock bolt by a driving force of an electric motor so as to engage or disengage the lock bolt with or from a movable member operating in synchronization with an operation of a steering wheel and that thereby locks or unlocks the steering wheel, the motor-driven steering lock device characterized in that cam grooves inclined relative to a circumferential direction of a cylindrical part of the lock bolt are formed on an outer circumferential surface of the cylindrical part, in that a cylindrical rotator which is driven to rotate by the electric motor is provided, in that the cylindrical part of the lock bolt is disposed inside the rotator so as to be movable in an axial direction of the rotator, and in that cam followers held by holder parts of the rotator are moved in the cam grooves so as to move the lock bolt.

In accordance with this configuration, the lock bolt is actuated by the rotator that rotates in directions perpendicular to the directions of the movement of the lock bolt, the lock bolt is disposed inside the rotator, and therefore a size of the motor-driven steering lock device can be decreased. Besides, the cam grooves can easily be formed and a plurality of cam grooves or one long cam groove can be formed in shapes that do not intersect with each other or itself because the cam grooves are formed on the outer circumferential surface of the lock bolt.

In the motor-driven steering lock device of the first aspect of the invention, two sets of the cam grooves and the cam followers may be provided in positions about 180 degrees apart.

By the provision of the two cam grooves and the two cam followers, the lock bolt can be actuated with less rattle than in the device with one cam groove and one cam follower.

Provided that the two cam followers are disposed in positions shifted from each other with respect to the axial direction of the rotator, the rotator and the cylindrical part of the lock bolt on which the cam grooves are formed are extended in the axial direction by an amount of the shift, and the size of the motor-driven steering lock device is made all the larger. By contrast, provision of the two cam followers on an identical plane perpendicular to the axial direction of the rotator makes it possible to decrease lengths of the rotator and the cylindrical part of the lock bolt and to decrease the size of the motor-driven steering lock device.

In the motor-driven steering lock device of the first aspect of the invention, a biasing member for biasing the lock bolt toward a locked position may be provided and the holder parts of the rotator may be provided as longitudinal grooves extending in directions in which the lock bolt is moved.

When the locking operation is carried out in such a configuration on condition that a front end of the lock bolt does not coincide with engagement part of the movable member, the lock bolt is stopped on its way and cannot move to the locked position in which the lock bolt engages with the engagement part of the movable member. Instead, the cam followers move opposite in direction to the movable member, along the longitudinal grooves. When the front end of the lock bolt coincides with the engagement part of the movable member, a biasing force exerted by the biasing member moves the lock bolt to the locked position. Accordingly, the lock bolt can be moved to the locked position without overload on the electric motor and without re-operation of the electric motor on condition that the lock bolt is stopped halfway through the locking operation.

In the motor-driven steering lock device of the first aspect of the invention, the cam grooves may have a slight angle of inclination on rear end side of the lock bolt and may have a steep angle of inclination on front end side of the lock bolt.

Such variation in the angle of inclination in the middle of the cam grooves increases a drawing load when the lock bolt is moved to the unlocked position and accelerates motion of the lock bolt after the lock bolt is drawn out. The increase in the drawing load makes it possible to reliably draw out the lock bolt even on condition that exertion of a stationary steering torque on a steering shaft has brought an inner side surface of an engagement recess of the steering shaft into pressure contact with the front end of the lock bolt. In addition, reduction gears or the like for increasing the drawing load can be eliminated and a size of the motor can be decreased. This makes it possible to reduce number of components and to decrease a size of the motor-driven steering lock device as a whole. Furthermore, the acceleration of the motion of the lock bolt after the lock bolt is drawn out decreases a length of operating time of the motor and decreases power consumption.

In the motor-driven steering lock device of the first aspect of the invention, the cam followers may be spherical ball members.

The actuation of the lock bolt through medium of such spherical ball members prevents abrasion of the cam grooves, occurrence of abnormal noise, and the like and decreases resistance when the cam followers move in the cam grooves.

As described above, the motor-driven steering lock device of the first aspect of the invention has a simple configuration and enables decreasing the size of the motor-driven steering lock device, re-actuating the lock bolt to the locked position after the stoppage on its way, and drawing out the lock bolt against the stationary steering torque.

A second aspect of the invention is a motor-driven steering lock device that actuates a lock bolt by a driving force of an electric motor so as to engage or disengage the lock bolt with or from a movable member operating in synchronization with an operation of a steering wheel and that thereby locks or unlocks the steering wheel, the motor-driven steering lock device characterized in that a cam mechanism for actuating the lock bolt at least from a locked position to an unlocked position is provided and in that angles of inclination of cam surfaces of the cam mechanism vary according to positions of the lock bolt.

In the motor-driven steering lock device of the second aspect of the invention, preferably, the cam surfaces have a slight angle of inclination when a position of the lock bolt is in vicinity of the locked position and have a steep angle of inclination when the position of the lock bolt is in vicinity of the unlocked position.

In the motor-driven steering lock device of the second aspect of the invention, the cam mechanism may include a rotator which is driven to rotate by the electric motor, the cam surfaces may be provided on one of the rotator and the lock bolt, and cam followers that move along the cam surfaces may be provided on the other of the rotator and the lock bolt.

In accordance with the motor-driven steering lock device of the second aspect of the invention, the variation in the angle of inclination in the middle of the cam surfaces increases a drawing load when the lock bolt is actuated from the locked position to the unlocked position and accelerates motion of the lock bolt after the lock bolt is drawn out. The increase in the drawing load makes it possible to reliably draw out the lock bolt even on condition that exertion of a stationary steering torque on a steering shaft has brought an inner side surface of an engagement recess of the steering shaft into pressure contact with a front end of the lock bolt. In addition, reduction gears or the like for increasing the drawing load can be eliminated and a size of the motor can be decreased. This makes it possible to reduce number of components and to decrease a size of the motor-driven steering lock device as a whole. Furthermore, the acceleration of the motion of the lock bolt after the lock bolt is drawn out decreases a length of operating time of the motor and decreases power consumption.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
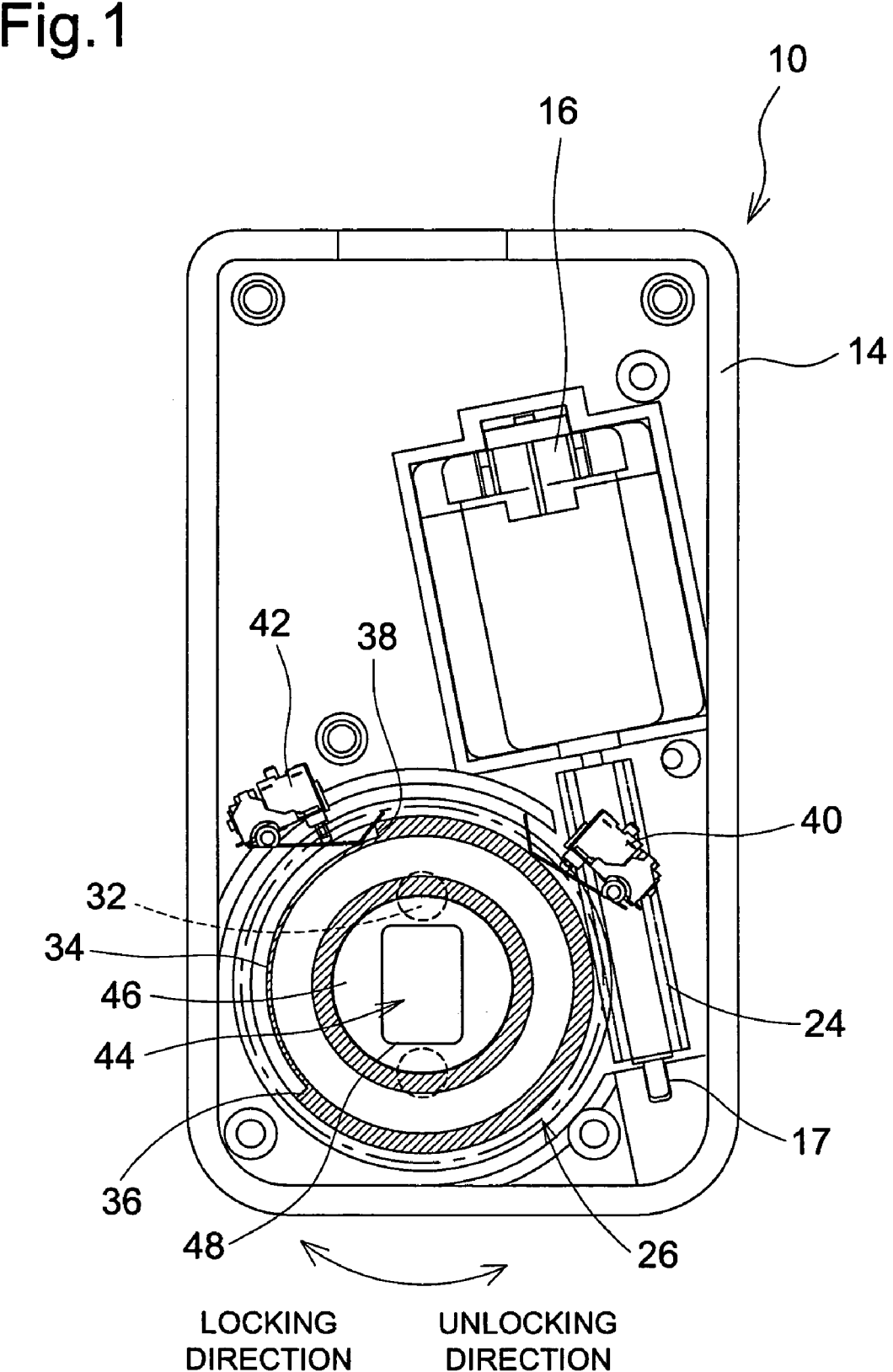
FIG. 1 is a plan view of a motor-driven steering lock device in accordance with an embodiment of the invention.
Figure 2:
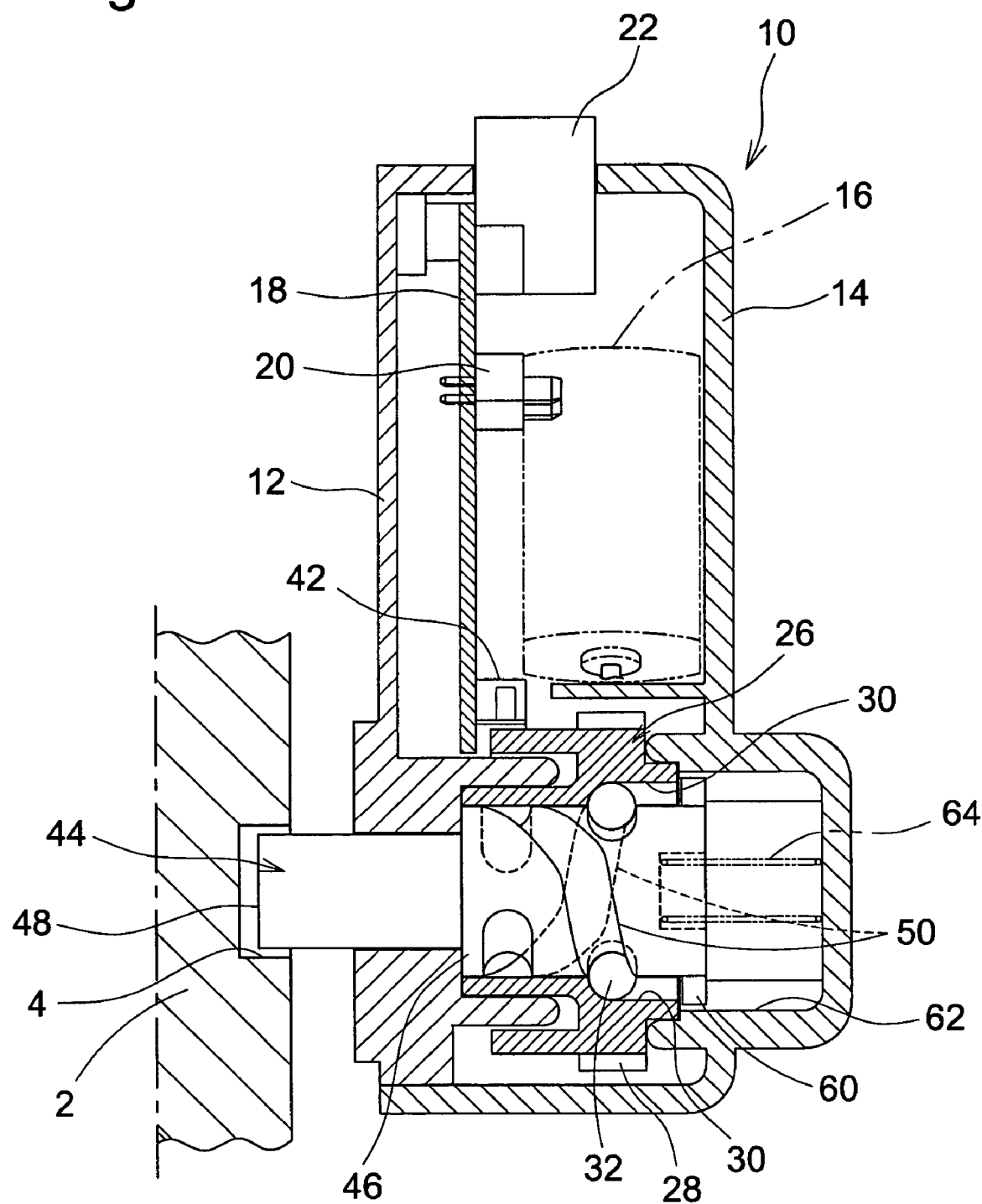
FIG. 2 is a sectional side view of the motor-driven steering lock device of FIG. 1 that has been in locked state.

FIG. 1 is a plan view of a motor-driven steering lock device 10 that is the embodiment of the invention, and FIG. 2 is a sectional side view of the motor-driven steering lock device 10 that has been in locked state. In FIG. 2 (ditto for FIGS. 4 and 5), for convenience sake, left side is referred to as "front" and right side is referred to as "rear."

The motor-driven steering lock device 10 has a case 14 that is closed with a cover 12. An electric motor 16 is fixed in the case 14. The electric motor 16 is electrically connected to terminals 20 fixed on a printed board 18, and a controller unit not shown feeds electric power to the electric motor 16 through the printed board 19 and the terminals 20 from a connector 22 protruding on a side surface of the case 14, so that the electric motor 16 is made to run normally or reversely. On a rotating shaft 17 of the electric motor 16 is mounted a worm 24.

In the case 14 is provided a cylindrical rotator 26. The rotator 26 is held in a specified position by the cover 12 and the case 14 so that the rotator 26 can be rotated but cannot be moved back and forth. On an outer circumference of the rotator 26 is formed a worm gear 28. The worm gear 28 meshes with the worm 24. Thus the rotator 26 is driven to be rotated by the electric motor 16.

On an inner circumference of the rotator 26, two longitudinal grooves 30 are formed in positions about 180 degrees apart. The longitudinal grooves 30 extend along an axial direction of the rotator 26 (which direction coincides with a direction of actuation of a lock bolt that will be described later). The longitudinal grooves 30 have generally semicircular cross sections and form holder parts for holding two cam followers 32 composed of spherical ball members. The two cam followers 32 are provided on an identical plane perpendicular to the axial direction of the rotator 26. The cam followers 32 are not necessarily limited to spherical ball members but may be members having other shapes.

On the outer circumference of the rotator 26, a recess 34 dented over a specified angular range is formed adjacent to the worm gear 28. Both ends of the recess 34 with respect to a circumferential direction form step parts 36 and 38 for switching. Detection levers of a first detection switch 40 and of a second detection switch 42 for detecting a rotational position of the rotator 26 are in contact with the outer circumference of the rotator 26 on which the recess 34 is formed. When the motor-driven steering lock device 10 is in locked state as shown in FIG. 1, the first detection switch 40 is in ON state and the second detection switch 42 is in OFF state in which the detection lever thereof has fallen into the recess 34.

Inside the rotator 26, the lock bolt 44 is disposed so as to be movable in the axial direction of the rotator 26. The lock bolt 44 is composed of a cylindrical part 46 positioned in the rotator 26 and a bar-shaped part 48 extending from the cylindrical part 46 and having a generally rectangular cross section. When the motor-driven steering lock device 10 is in the locked state, as shown in FIG. 2, a front end of the bar-shaped part 48 of the lock bolt 44 that extends outside from the cover 12 has advanced into and has engaged with an engagement recess 4 of a steering shaft (movable member) 2 so that turn of the steering shaft 2 is restricted. In this state, the lock bolt 44 is in locked position.

In the embodiment, the movable member that turns with turning operation of a steering wheel not shown is described as the steering shaft 2. The movable member, however, is not limited to the steering shaft 2 but may be other members that operate in synchronization with the steering wheel operation.

On an outer circumferential surface of the cylindrical part 46 of the lock bolt 44 are formed two cam grooves 50 inclined relative to a circumferential direction of the cylindrical part 46. Cross sections of the cam grooves 50 are generally semicircular, and the two cam followers 32 held in the longitudinal grooves 30 of the rotator 26 fit in the cam grooves 50. Thus the cam followers 32 held in the rotator 26 and the cam grooves 50 formed on the lock bolt 44 make a cam mechanism, and inner side surfaces of the cam grooves 50 form cam surfaces.

In the embodiment, the cam grooves 50 are provided on the lock bolt 44 and the cam followers 32 are provided in the rotator 26. On the contrary, the cam followers 32 may be provided on the lock bolt 44 and cam grooves may be provided on an inner circumferential surface of the rotator 26.

Figure 3:
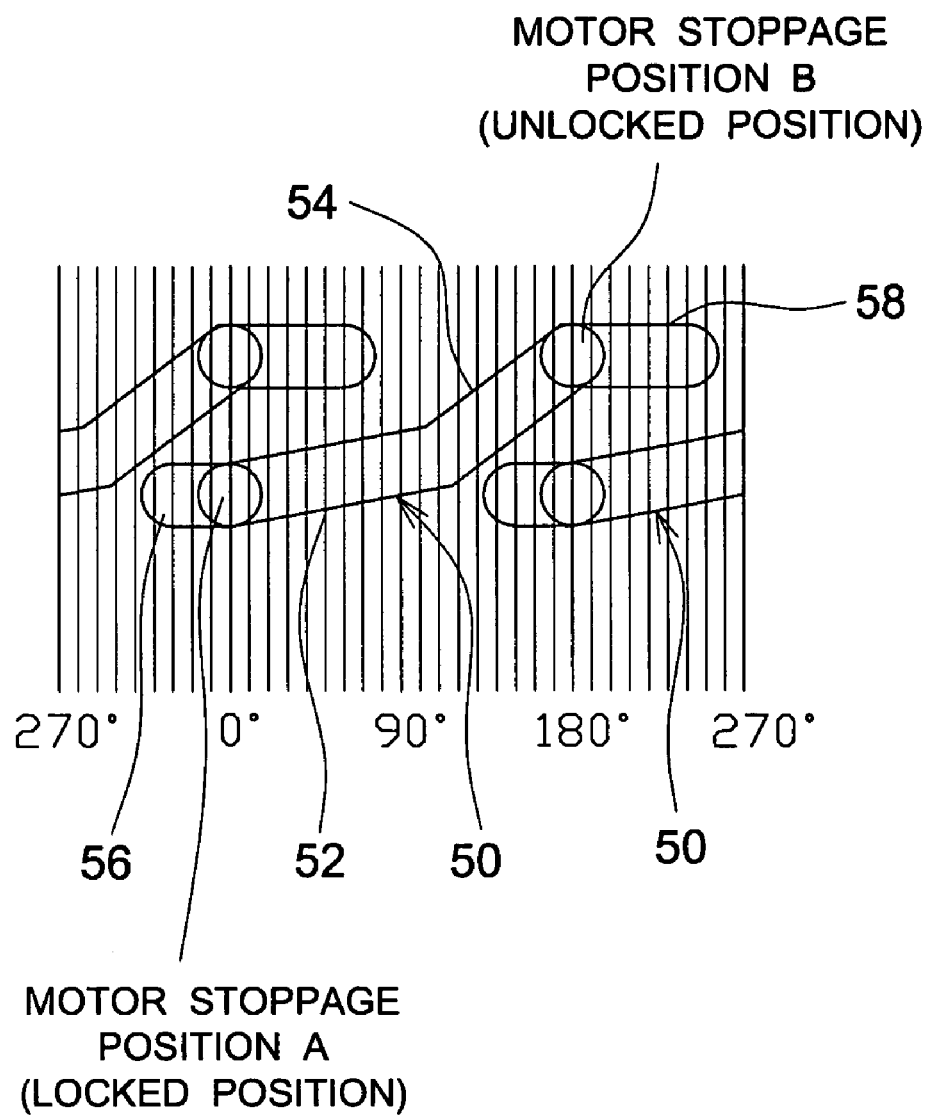
FIG. 3 is a development view of an outer circumferential surface of a cylindrical part of a lock bolt.

FIG. 3 shows a development view of the outer circumferential surface of the cylindrical part 46. Vertical lines having uniform intervals in the drawing are angle lines having steps of ten degrees. Upside in the drawing corresponds to a front end side of the lock bolt 44 (i.e., a side of the steering shaft 2), and downside in the drawing corresponds to a rear end side of the lock bolt 44. As shown in FIG. 3, one of the cam grooves 50 includes inclined parts 52 an 54 that are inclined relative to the circumferential direction (a horizontal direction in FIG. 3) of the cylindrical part 46 of the lock bolt 44 and extending parts 56 and 58 that extend in the circumferential direction of the cylindrical part 46 from both ends of the inclined parts 52, 54.

The inclined parts 52 and 54 are composed of a slightly inclined part 52 that is on the rear end side of the lock bolt 44 and that has a slight angle of inclination and a steeply inclined part 54 that is on the front end side of the lock bolt 44 and that has a steep angle of inclination. As will be described later, the lock bolt 44 is positioned adjacent to the locked position when the cam followers 32 are positioned in the slightly inclined parts 52 of the cam grooves 50, and the lock bolt 44 is positioned adjacent to an unlocked position when the cam followers 32 are positioned in the steeply inclined parts 54 of the cam grooves 50. That is, the angles of inclination of the cam grooves 50 vary according to the positions of the lock bolt 44.

The extending parts 56 and 58 are provided so that the cam followers 32 may come into the extending parts 56 and 58 on condition that stoppage of drive of the electric motor 16 upon arrival of the cam followers 32 at motor stoppage positions A or B shown in the drawing fails to immediately stop the electric motor 16 or the rotator 26 because of inertial rotation. This configuration prevents sudden stoppage of the electric motor 16 to prevent overload on the electric motor 16 and allows the motor stoppage positions to be set within a certain range including an error. The extending parts 56 and 58 extend in the circumferential direction of the cylindrical part 46 and therefore the lock bolt 44 does not move when the cam followers 32 moves into the extending parts 56 and 58.

The other cam groove 50 has a similar shape but is formed in a position about 180 degrees apart from the one cam groove 50. The two cam grooves 50 have parts positionally overlapping each other as seen looking in the axial direction of the cylindrical part 46 but are formed so as not to intersect with each other.

The provision of the two cam grooves 50 and the two cam followers 32 in the embodiment has an effect of preventing the lock bolt 44 from rattling when the lock bolt 44 is actuated as will be described later, in comparison with provision of only one cam groove and one cam follower. The lock bolt 44, however, can be actuated by one cam groove 50 and one cam follower 32. In this case, the cam groove 50 may be formed as one long groove that extends spirally, for example, so as not to intersect with itself.

On an outer circumference of the rear end of the lock bolt 44, two engagement protrusions 60 are provided in positions 180 degrees apart. The engagement protrusions 60 are slidably engaged with two engagement grooves 62 formed on an inner surface of the case 14. Thus the lock bolt 44 is allowed to move back and forth but cannot be turned.

Between the rear end of the lock bolt 44 and the case 14 is disposed a spring 64 as a biasing member. The spring 64 biases the lock bolt 44 toward the steering shaft 2.

Subsequently, operation of the motor-driven steering lock device 10 having the above configuration will be described.

When the motor-driven steering lock device 10 is in the locked state as shown in FIGS. 1 and 2, the rotator 26 starts to rotate in an unlocking direction (i.e., counterclockwise direction) shown in FIG. 1 with normal rotation of the electric motor 16. With the start of the rotation, the detection lever of the second detection switch 42 climbs upon the step part 38 for switching of the rotator 26, and the second detection switch 42 is thereby turned into ON state.

When the rotator 26 starts to rotate in this manner, the cam followers 32 adjacent to the motor stoppage position A in FIG. 3 move while sliding or rotating in the cam grooves 50. The cam followers 32, however, are positioned at ends of the longitudinal grooves 30 and cannot move forward. Accordingly, the rotation of the rotator 26 causes the lock bolt 44 to start to move rearward.

When the cam followers 32 move along the slightly inclined parts 52 of the cam grooves 50, the lock bolt 44 recedes slowly in comparison from the locked position. This arrangement increases a drawing load when the front end of the lock bolt 44 is drawn out from the engagement recess 4 of the steering shaft 2. Thus the lock bolt 44 can reliably be drawn out even on condition that exertion of a stationary steering torque on the steering shaft 2 has brought an inner side surface of the engagement recess 4 into pressure contact with the front end of the lock bolt 44. In addition, reduction gears or the like for increasing the drawing load can be eliminated and a size of the electric motor 16 can be decreased. This makes it possible to reduce number of components and to decrease a size of the motor-driven steering lock device 10 as a whole.

When the cam followers 32 subsequently move to the motor stoppage positions B along the steeply inclined parts 54 of the cam grooves 50 with the rotation of the rotator 26, the lock bolt 44 recedes fast in comparison. Thus a length of operating time of the motor can be reduced by such acceleration of motion of the lock bolt 44 after the front end of the lock bolt 44 is drawn out from the engagement recess 4 of the steering shaft 2. This arrangement quickens response of a whole system including the controller unit for operating the motor of the motor-driven steering lock device 10 and decreases power consumption.

Figure 4:
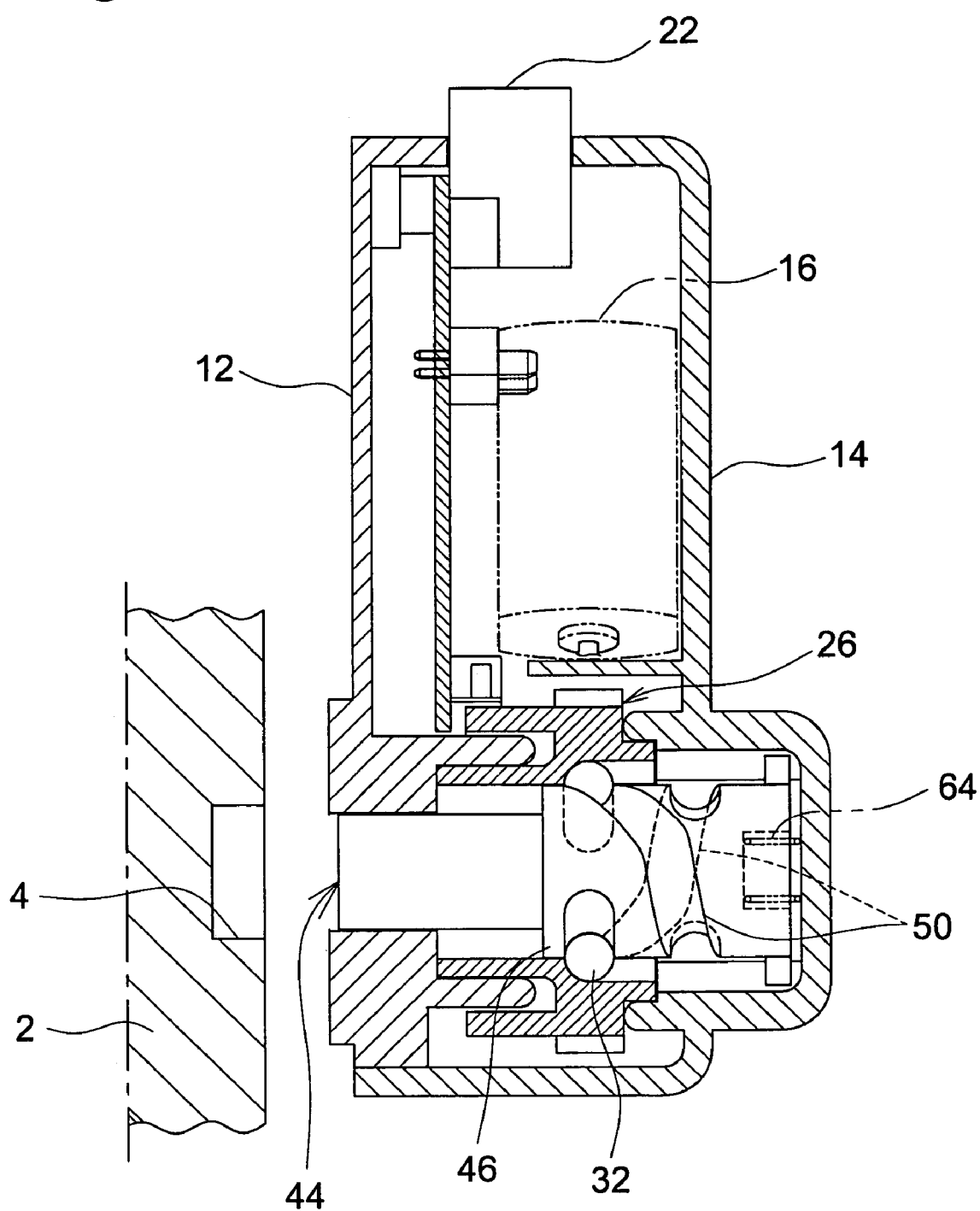
FIG. 4 is a sectional side view of the motor-driven steering lock device that has been in unlocked state.

As a result of about 180 degrees rotation of the rotator 26, the detection lever of the first detection switch 40 passes the step part 36 for switching of the rotator 26 and falls into the recess 34, so that the first detection switch 40 is thereby turned into OFF state. Upon reception of the OFF signal from the first detection switch 40, the normal rotation of the electric motor 16 is stopped, and the cam followers 32 slightly come into the extending parts 58 of the cam grooves 50 and then stop because of inertial rotation of the electric motor 16 and the rotator 26. At this time, the lock bolt 44 has receded to the unlocked position in which the front end of the lock bolt 44 has retracted into the cover 12, as shown in FIG. 4.

In this manner, the lock bolt 44 is actuated from the locked position to the unlocked position, the front end of the lock bolt 44 is thereby disengaged from the engagement recess 4 of the steering shaft 2, the restriction on the turn of the steering shaft 2 is lifted, and the steering wheel is unlocked.

In order to bring the motor-driven steering lock device 10 into the locked state, on the contrary, the electric motor 16 is reversely run until the second detection switch 42 is turned into OFF state shown in FIG. 1. The rotator 26 is thereby rotated about 180 degrees in a locking direction (i.e., clockwise direction) shown in FIG. 1, and the rotation of the rotator 26 moves the cam followers 32 to the motor stoppage positions A along the cam grooves 50. With such movement of the cam followers 32, a biasing force exerted by the spring 64 advances the lock bolt 44 from the unlocked position to the locked position shown in FIG. 2. Thus the front end of the lock bolt 44 advances into and engages with the engagement recess 4 of the steering shaft 2, the turn of the steering shaft 2 is restricted, and the steering wheel is locked.

In accordance with the motor-driven steering lock device 10 of the embodiment, as describe above, the lock bolt 44 is actuated by the rotator 26 that rotates in directions perpendicular to the directions of the movement of the lock bolt 44, and the lock bolt 44 is disposed inside the rotator 26. Therefore, the size of the motor-driven steering lock device 10 can be decreased. Besides, the cam grooves 50 can easily be formed and two cam grooves 50 or one long cam groove 50 can be formed in shapes that do not intersect with each other or itself because the cam grooves 50 are formed on the outer circumferential surface of the lock bolt 44.

By the provision of the two cam grooves 50 and the two cam followers 32, the lock bolt 44 can be actuated with less rattle than in the device with only one cam groove 50 and only one cam follower 32.

Provided that the two cam followers 32 are disposed in positions shifted from each other with respect to the axial direction of the rotator 26, the rotator 26 and the cylindrical part 46 of the lock bolt 44 on which the cam grooves 50 are formed are extended in the axial direction by an amount of the shift, and the size of the motor-driven steering lock device 10 is made all the larger. By contrast, the provision of the two cam followers 32 on the identical plane perpendicular to the axial direction of the rotator 26 makes it possible to decrease lengths of the rotator 26 and the cylindrical part 46 of the lock bolt 44 and to decrease the size of the motor-driven steering lock device 10.

Moreover, the actuation of the lock bolt 44 through medium of the cam followers 32 composed of the spherical ball members prevents abrasion of the cam grooves 50, occurrence of abnormal noise, and the like and decreases resistance when the cam followers 32 move in the cam grooves 50.

Figure 5:
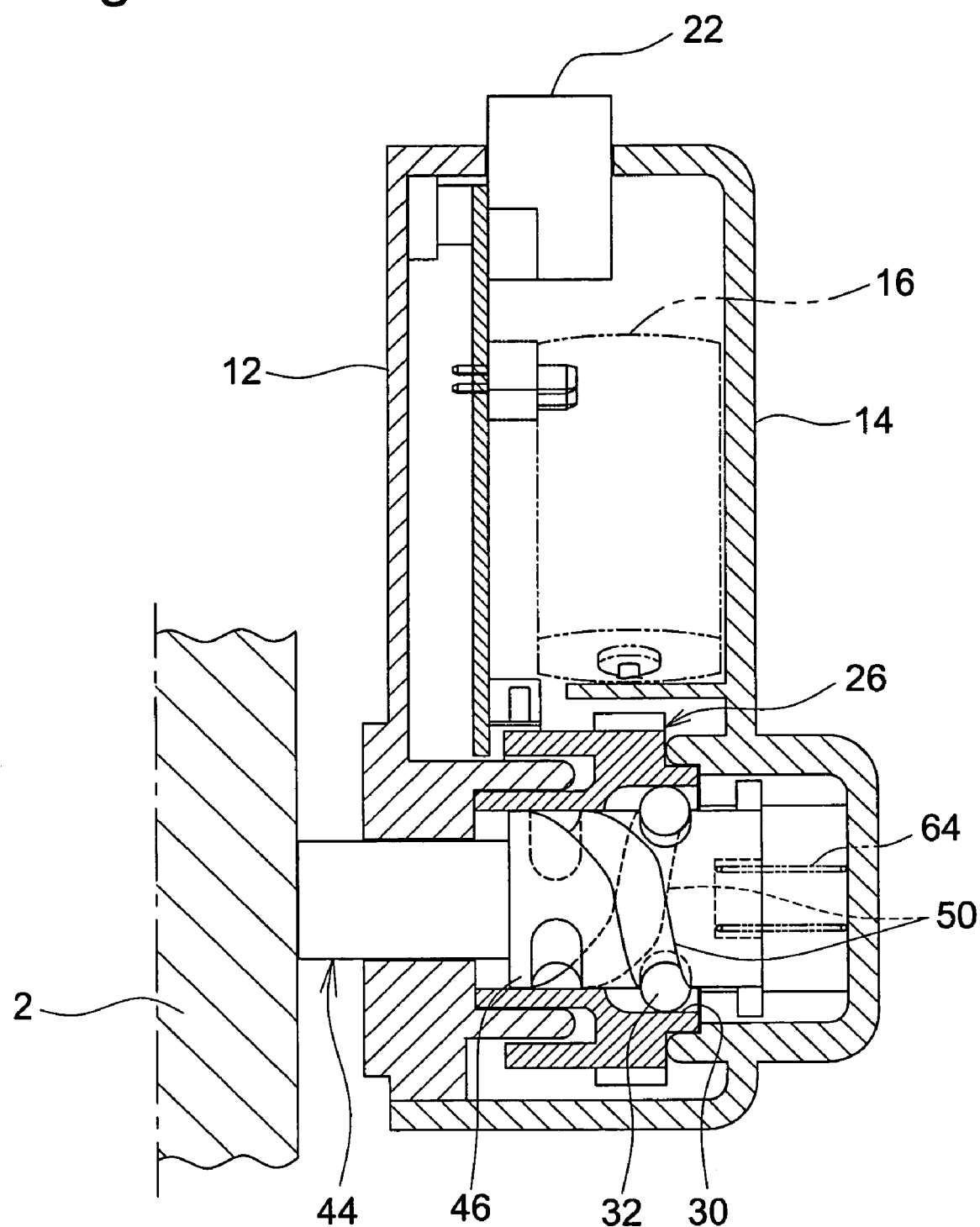
FIG. 5 is a sectional side view of the motor-driven steering lock device showing a state in which the lock bolt has been stopped on its way to a locked position.

Subsequently, operation of the motor-driven steering lock device 10 on condition that the engagement recess 4 of the steering shaft 2 does not coincide with the front end of the lock bolt 44 when the lock bolt 44 is moved to the locked position will be described with reference to FIG. 5.

When the locking operation is carried out on condition that the front end of the lock bolt 44 does not coincide with the engagement recess 4 of the steering shaft 2, the lock bolt 44 cannot be plunged into the engagement recess 4 of the steering shaft 2 and the front end thereof is blocked in contact with an outer circumferential surface of the steering shaft 2. In this case, however, the cam followers 32 are capable of receding along the longitudinal grooves 30 of the rotator 26, and therefore the blockage of the lock bolt 44 does not impede the rotation of the rotator 26 and of the electric motor 16. The electric motor 16 is stopped as usual after being reversely run until the second detection switch 42 is turned into the OFF state.

When subsequent turning operation of the steering wheel makes the engagement recess 4 of the steering shaft 2 coincide with the front end of the lock bolt 44, the biasing force exerted by the spring 64 plunges the front end of the lock bolt 44 into the engagement recess 4 of the steering shaft 2 so as to move the lock bolt 44 to the locked position.

In accordance with the motor-driven steering lock device 10, as described above, the lock bolt 44 can be moved to the locked position without overload on the electric motor 16 and without re-operation of the electric motor 16 on condition that the lock bolt 44 is stopped halfway through the locking operation.

Though the lock bolt 44 is directly engaged with the engagement recess 4 of the steering shaft 2 in the embodiment, there is no limitation to that. For example, another locking member that engages with the engagement recess 4 may be provided and the locking member may be actuated by the lock bolt 44.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A motor-driven steering lock device comprising:

an electric motor;

a cylindrical rotator to be rotated by said electric motor, said rotator having holder parts;

a lock bolt for engaging and disengaging a movable member to be operated in synchronization with an operation of a steering wheel so as to lock and unlock the steering wheel, said lock bolt having a cylindrical portion arranged inside said rotator so as to be movable in an axial direction of said rotator, said cylindrical portion having an outer circumferential surface and cam grooves formed in said outer circumferential surface, each of said cam grooves having:

a first inclined portion located toward a rear-end side of said lock bolt and being slightly inclined relative to a plane perpendicular to an axial direction of said cylindrical portion; and a second inclined portion located toward a front-end side of said lock bolt and being steeply inclined relative to the plane perpendicular to the axial direction of said cylindrical portion; and cam followers held by said holder parts of said rotator so as to engage and move within said cam grooves of said lock bolt so as to move said lock bolt based on a rotation of said rotator.

2. The motor-driven steering lock device of claim 1, wherein said cam grooves and said cam followers are arranged to form a first set of a first cam follower permanently fitted in a first cam groove, and a second set of a second cam follower permanently fitted in a second cam groove.

3. The motor-driven steering lock device of claim 1, further comprising a biasing member for biasing said lock bolt toward the movable member, said holder parts of said rotator comprising longitudinal grooves extending in the axial direction of said rotator.

4. The motor-driven steering lock device of claim 1, wherein said cam followers comprise spherical ball members.

* * * * *